United States Patent
Llewellyn et al.

(10) Patent No.: US 12,123,535 B2
(45) Date of Patent: Oct. 22, 2024

(54) EXPANDABLE PIPE INCLUDING A LINER FOR RESTORING A CONDUIT

(71) Applicant: Recyca-Pipe of America L.L.C., Detroit, MI (US)

(72) Inventors: Clinton Edward Llewellyn, Waterford, MI (US); Alfred G. Hering, Southport, NC (US); Bowdie J. Isanhart, Coleman, MI (US); John Harry Camp, New Smyrna Beach, FL (US)

(73) Assignee: RECYCA-PIPE OF AMERICA L.L.C., Detroit, MI (US)

( * ) Notice: Subject to any disclaimer, the term of this patent is extended or adjusted under 35 U.S.C. 154(b) by 0 days.

(21) Appl. No.: 17/533,503

(22) Filed: Nov. 23, 2021

(65) Prior Publication Data

US 2022/0082196 A1    Mar. 17, 2022

Related U.S. Application Data

(60) Continuation of application No. 16/806,308, filed on Mar. 2, 2020, now Pat. No. 11,204,125, which is a
(Continued)

(51) Int. Cl.
*F16L 55/165*    (2006.01)
*B29C 63/00*    (2006.01)
(Continued)

(52) U.S. Cl.
CPC ...... *F16L 55/1652* (2013.01); *B29C 63/0017* (2013.01); *B29C 63/34* (2013.01);
(Continued)

(58) Field of Classification Search
CPC ... F16L 55/1652; F16L 55/1654; F16L 55/18; F16L 55/1656; B29C 63/0017;
(Continued)

(56) References Cited

U.S. PATENT DOCUMENTS 1,961,148 A    6/1934    Herman
3,960,644 A    6/1976    McFadden
(Continued)

FOREIGN PATENT DOCUMENTS

CN    1745270 A    3/2006
CN    101060978 A    10/2007
(Continued)

OTHER PUBLICATIONS

First Chinese Office Action issued Oct. 12, 2019 regarding Chinese Application No. 201780009323.9.
(Continued)

*Primary Examiner* — David R Deal
(74) *Attorney, Agent, or Firm* — Dickinson Wright PLLC

(57) ABSTRACT

An expandable pipe for restoring a damaged pipe is provided. The expandable pipe includes a liner formed of thermoplastic polyurethane, and grout material applied to the exterior surface of the liner. The exterior surface includes a plurality of flared tips and grooves, and each groove is located between adjacent flared tips. The grout material is disposed on the flared tips and in the grooves of the liner. The method used to restore the damaged pipe includes clamping the liner with the grout material on a puller-sealer fixture having a U-shaped cross-section to prevent debris from entering the interior of the liner, and pulling the puller-sealer fixture and liner through the damaged pipe. The grout material expands in volume upon exposure to moisture, ultra violet radiation, heat, and/or ultrasonics, and fills cracks or other imperfections and voids along the interior surface of the conduit, caused by corrosion, erosion, or other circumstances.

11 Claims, 6 Drawing Sheets

Related U.S. Application Data division of application No. 15/419,525, filed on Jan. 30, 2017, now Pat. No. 10,578,240.

(60) Provisional application No. 62/432,265, filed on Dec. 9, 2016, provisional application No. 62/289,760, filed on Feb. 1, 2016.

(51) Int. Cl.
*B29C 63/34* (2006.01)
*B29C 63/36* (2006.01)
*B29D 23/00* (2006.01)
*F16L 55/164* (2006.01)
*F16L 55/18* (2006.01)
*B29K 75/00* (2006.01)
*B29K 105/06* (2006.01)
*H02G 3/04* (2006.01)

(52) U.S. Cl.
CPC .............. *B29C 63/36* (2013.01); *B29D 23/00* (2013.01); *B29D 23/001* (2013.01); *F16L 55/1654* (2013.01); *F16L 55/18* (2013.01); *B29K 2075/00* (2013.01); *B29K 2105/06* (2013.01); *F16L 55/164* (2013.01); *F16L 55/1656* (2013.01); *H02G 3/04* (2013.01)

(58) Field of Classification Search
CPC ......... B29C 63/34; B29C 63/36; B29D 23/00; B29D 23/001; B29K 2075/00; B29K 2105/06; H02G 3/04
USPC .......................................................... 138/98
See application file for complete search history.

(56) References Cited

U.S. PATENT DOCUMENTS

| | | |
|---|---|---|
| 4,895,633 A | 1/1990 | Seto et al. |
| 5,101,863 A | 4/1992 | Fujii et al. |
| 5,102,263 A | 4/1992 | Allen et al. |
| 5,411,060 A * | 5/1995 | Chandler ............... B29C 63/34 |
| | | 138/114 |
| 5,452,853 A | 9/1995 | Shook |
| 5,580,406 A | 12/1996 | O'ffill |
| 5,762,450 A | 6/1998 | Schmager |
| 5,791,378 A | 8/1998 | Stephens |
| 5,817,200 A | 10/1998 | O'ffill |
| 5,928,447 A | 7/1999 | GianFrancisco |
| 6,167,913 B1 | 1/2001 | Wood et al. |
| 6,302,983 B1 | 10/2001 | Agren et al. |
| 6,796,334 B2 | 9/2004 | Ishikawa et al. |
| 6,966,950 B2 | 11/2005 | Winiewicz et al. |
| 7,025,580 B2 * | 4/2006 | Heagy .................... B29C 63/34 |
| | | 405/184.2 |
| 7,942,167 B1 | 5/2011 | Llewellyn |
| 10,578,240 B2 * | 3/2020 | Llewellyn ............... B29C 63/34 |
| 11,204,125 B2 * | 12/2021 | Llewellyn ........... B29C 63/0017 |
| 2003/0159776 A1 | 8/2003 | Graham |
| 2005/0028881 A1 | 2/2005 | Smith et al. |
| 2008/0178955 A1 | 7/2008 | Bryant et al. |
| 2008/0213047 A1 | 9/2008 | Bryant et al. |
| 2009/0080980 A1 | 3/2009 | Cohen |
| 2009/0194184 A1 | 8/2009 | Kiest, Jr. |
| 2010/0212803 A1 | 8/2010 | Carr et al. |
| 2011/0297243 A1 | 12/2011 | Kiest, Jr. |
| 2012/0141210 A1 | 6/2012 | Kiest, Jr. |

FOREIGN PATENT DOCUMENTS

| | | |
|---|---|---|
| DE | 3714458 A1 | 11/1988 |
| JP | H01280510 A | 11/1989 |
| JP | H10503134 A | 3/1998 |
| JP | IPH11333934 A | 12/1999 |
| WO | 8911060 A1 | 11/1989 |
| WO | 9618492 A1 | 6/1996 |

OTHER PUBLICATIONS

International Search Report and Written Opinion regarding PCT/US2017/015712 mailed Jul. 19, 2017.

\* cited by examiner

Coating Tank

| | |
|---|---|
| Structure | Aluminum |
| Capacity | 100 gals. |
| Primary guide rollers | 6" dia |
| Secondary guide rollers | 3" dia |
| Roller material | UHMWPE |
| Wiper material | Teflon |
| Power requirements | None |
| Bottom drain | Included |
| Sensor | Liquid level |

Mixing Tank

| | |
|---|---|
| Structure | Aluminum |
| Capacity | 100 gals. |
| Mixing blade | High shear |
| Motor | 3 HP |
| Power | 110 VAC |
| Transfer pump | 1/2 hp |
| Controls | Manual |

FIG. 6

EXPANDABLE PIPE INCLUDING A LINER FOR RESTORING A CONDUIT

CROSS-REFERENCE TO RELATED APPLICATIONS

This U.S. Continuation patent application claims priority to U.S. Divisional patent application Ser. No. 16/806,308, filed Mar. 2, 2020, which claims priority to U.S. utility patent application Ser. No. 15/419,525, filed Jan. 30, 2017, which claims priority to U.S. provisional patent application No. 62/289,760, filed Feb. 1, 2016, and U.S. provisional patent application No. 62/432,265, filed Dec. 9, 2016, the contents of which are incorporated herein by reference in their entirety.

BACKGROUND OF THE INVENTION

1. Field of the Invention

The invention relates to products and methods for restoration of damaged conduits.

2. Related Art

Grout materials are often used to repair an interior surface of corroded, cracked, or otherwise damaged conduit. One method of repairing a metal conduit includes coupling short links of stainless steel sleeves to one another to form a liner, and pulling the stainless steel liner through the metal conduit with a cable to present a small annular space between the stainless steel liner and the metal conduit. A grout material is then pumped into the annular space to fill the annular space and cracks in the metal conduit. However, this method includes significant material costs and labor costs. Further, in the above method and other methods currently used, controlling the placement of the grout material is difficult. Oftentimes, the grout material is disposed unevenly along the damaged conduit and does not fill all of the cracks of the conduit.

Another more recently developed method for repairing damaged conduits with a grout material includes the use of an expandable pipe. The expandable pipe includes a liner and the grout material disposed in grooves along the exterior surface of the liner. The liner with the grout material is disposed in an opening of the damaged conduit, and then exposed to moisture such that the grout material expands and engages the interior surface of the damaged conduit.

The grooves of the liner allow for the expandable pipe to fold for convenient transportation of the expandable pipe. The grooves also provide flexibility for maneuvering the expandable pipe around bends of the damaged conduit. The grooves of the liner also allow for controlled placement and amount of the grout material along the exterior surface of the liner. The grooves maintain the placement of the grout material as the liner is disposed in the damaged conduit. The grout material expands to engage the interior surface of the damaged conduit and fills cracks, holes, indentations, or other imperfections and voids along the interior surface of the conduit, caused by corrosion, erosion, or other circumstances. In other words, the expandable pipe relines the interior surface of the damaged conduit. The expandable pipe also provides a seal to the conduit and prevents water and debris from entering the conduit. The grout material of the expandable pipe can also expand through holes in the conduit and fill voids in earth surrounding the conduit. The expandable pipe is a cost-effective and convenient way to repair and restore conduits of various types, such as sewer pipes, potable water pipes, electrical pipes, and air ducts. An example of the expandable pipe is disposed in U.S. Pat. No. 7,942,167.

SUMMARY

One aspect of the disclosure provides an expandable pipe for restoring a damaged pipe. The expandable pipe includes a liner formed of a polymer-based and/or elastomer-based material. The liner including a plurality of fibers. The liner includes an exterior surface, and the exterior surface of the liner includes a plurality of grooves. A grout material formed of polyurethane and fibers is disposed in the grooves of the liner, and the grout material is expandable in a dimension upon exposure to moisture, ultra violet radiation, heat, and/or ultrasonics.

Another aspect of the disclosure provides a method of manufacturing an expandable pipe for restoring a damaged pipe. The method comprises extruding a liner formed of a polymer-based and/or elastomer-based material and including a plurality of fibers, the extruded liner including an exterior surface with a plurality of grooves. The method further includes disposing a grout material formed of polyurethane and fibers in the grooves of the liner, and the grout material being expandable in a dimension upon exposure to moisture, ultra violet radiation, heat, and/or ultrasonics.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 6 includes example specifications of a coating tank and a mixing tank of the dip tank assembly according to the example embodiment.

DETAILED DESCRIPTION OF EXAMPLE EMBODIMENTS

Figure 1:
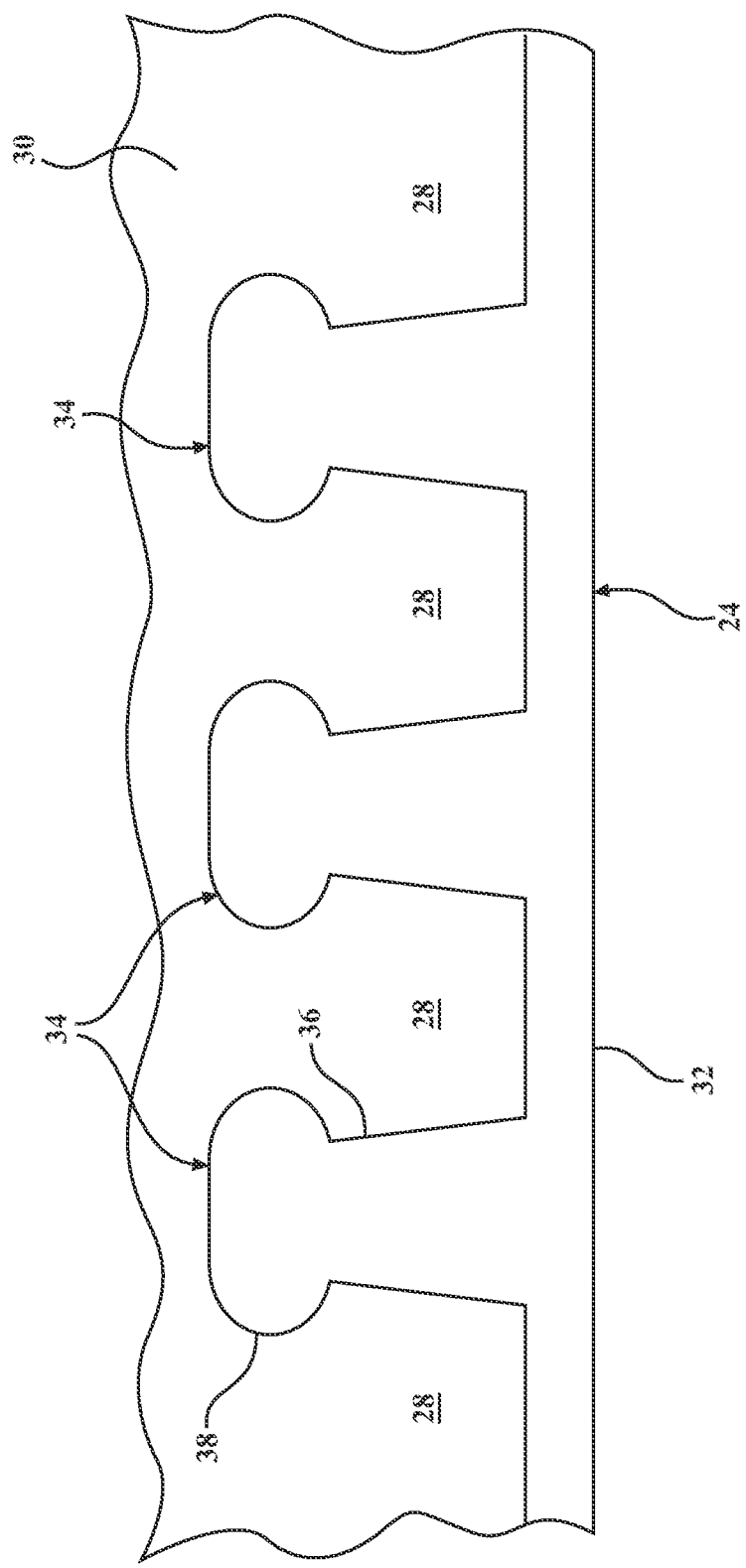
FIG. 1 is a cross-sectional view of a portion of a liner according to an example embodiment of the invention.

An expandable pipe 20 for restoring a damaged conduit 22, also referred to as a host pipe, is shown in FIGS. 1-13 of the related U.S. provisional patent application No. 62/289,760. The damaged conduit or host pipe 22 is a pipe in the ground that requires rehabilitation. For example, the expandable pipe 20 can be used to repair or restore conduits or host pipe 22 of various types, such as water conduits, gas conduits, oil conduits, sewer pipes, potable water pipes, electrical pipes, and air ducts.

The expandable pipe 20 includes an improved liner 24 formed of a polymer-based and/or elastomer-based material, and a grout material 30 applied to an exterior surface 26 of the liner 24. The exterior surface 26 of the liner 24 can include grooves 28 or a profiled surface to maintain the grout material 30 in place as the liner 24 is disposed in the host pipe 22. The grout material 30 expands in a dimension Di, such as volume, upon exposure to or contact with moisture, ultra violet (UV) radiation heat, and/or ultrasonics. Moisture, ultra violet radiation, heat, and/or ultrasonics are also able to cure the grout material 30. Thus, after such exposure, the grout material 30 contacts an inner diameter surface of the damaged host pipe 22 and fills voids in the damaged host pipe 22. The volume of the grout material 30 after expansion is 1% to 1000% greater than the volume of the grout material 30 before expansion. The grout material 30 then hardens to restore the integrity of the host pipe 22. In addition to the embodiments described in U.S. provisional patent application No. 62/289,760, several other embodiments are possible, which are described herein with reference to FIGS. 1-4 of the present application.

As stated above, the liner 24 is formed of a polymer-based and/or elastomer-based material. The liner 24 can be formed of a single polymer-based or elastomer-based material, for example a thermoplastic material. Alternatively, the liner 24 can include more than one polymer and/or elastomer. According to example embodiments, the liner 24 is extruded from clear thermoplastic polyurethane (TPU). The clear liner 24 is preferred for viewing purposes, for example to view the inside of the damaged host pipe 22 being repaired using a video camera. However, the liner 24 could be another color and does not have to be clear to function as intended. The liner 24 could also have another composition. For example, the liner 24 could be formed of any material that can be folded then expanded, not limited to TPU. For example, the liner 24 could be formed of polyethylene or any medium density plastic. The liner 24 can optionally include fibers in the polymer-based and/or elastomer-based material, at least in a thin base portion of the liner 24, to increase strength and prevent ballooning of the liner 24. For example, the liner 24 could include a composite of multiple polymers and/or elastomers, and reinforcing fibers. The visual clarity of the TPU allows for convenient video identification of lateral access points to allow for trimming of the liner 24. After installation of the liner 24 in the host pipe 22, an interior diameter surface 32 of the liner 24 located opposite the exterior surface 26 is smooth.

Figure 2:
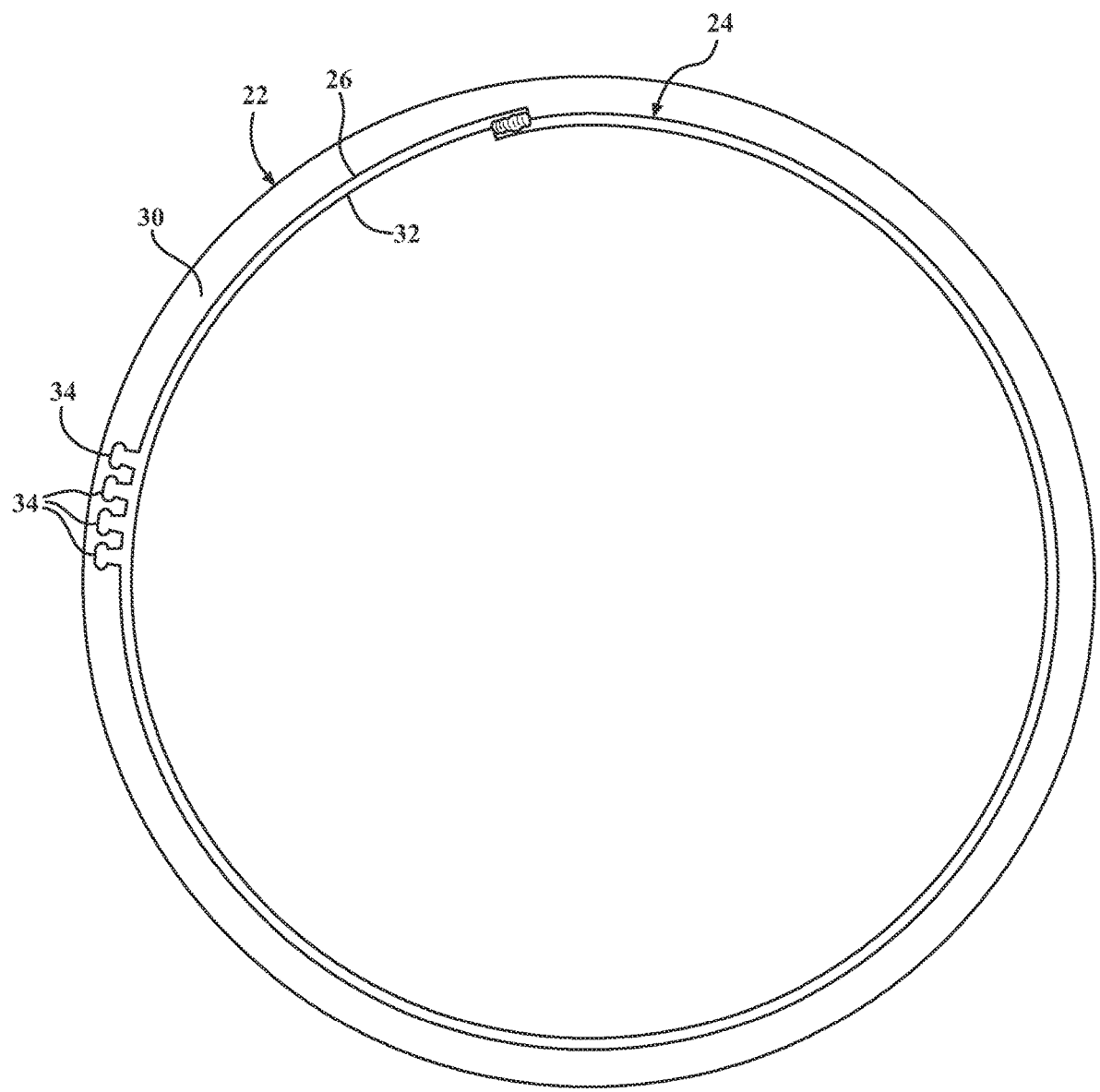
FIG. 2 is a cross-sectional view of the entire liner disposed inside of a host pipe according to the example embodiment of the invention.

According to a preferred embodiment, the grooves 28 of the liner 24 are achieved by a profile on an exterior surface 26, also referred to as an outer diameter surface, of the liner 24, as shown in FIGS. 1 and 2. In the embodiment of FIGS. 1 and 2, the profile of the exterior surface 26 of the liner 24 includes flared tips 34 which act as a mechanical lock for the grout material 30 applied to the exterior surface 26 of the liner 24. FIG. 1 only shows the flared tips 34 along a portion of the exterior surface 26 of the liner 24, but the flared tips 34 are preferably located along the entire exterior surface 26 of the liner 24, and continuously around the outer circumference of the liner 24. In the example of FIGS. 1 and 2, each groove 28 is formed between two adjacent flared tips 34, and the grout material 30 is contained in those grooves 28. The flared tips 34 include a stem 36 extending perpendicular to the base of the liner 24, and an enlarged top 38 which flares outwardly relative to the stem 36. The diameter or width of the enlarged top 38 is greater than the diameter or width of the stem 36. The flared tips 34 shown in FIGS. 1 and 2 are only an example, as the shape and dimensions of the flared tips 34 can vary. Alternatively, other profiled shapes and dimensions can be used to achieve the grooves 28 in the liner 24. However, the flared tips 34 or other mechanical locking features are not required if a sufficient bond between the liner 24 and the grout material 30 is achieved.

The liner 24 can be formed by extrusion, preferably in a flat extrusion die to produce a flat product, such as a sheet of the TPU or another thermoplastic material. The flat extruded product is then welded into a circular pipe shape to produce the liner 24 and so as to reside inside the host pipe 22, as shown in FIG. 2. In other words, the flat product is welded it at a circumference that matches the required diameter for the liner 24. The diameter of the liner 24 should be less than the inner diameter of the host pipe 22 when the liner 24 is inflated. For example, the liner 24 of the example embodiment has a 7.5 inch inner diameter when inflated, and the host pipe 22 has an 8 inch inner diameter. The liner 24 could be extruded to size, as a circular tube, however certain raw materials are difficult to extrude into circular geometries due to a lack of melt strength. The other advantage of extruding flat and welding is the ability to obtain any diameter with limited tooling.

According to the example embodiments, during installation of the liner 24 in the host pipe 22, the grout material 30, preferably urethane grout, such as an unactivated liquid polyurethane, is applied to the exterior surface 26 of the liner 24. The grout material 30 can optionally include fibers to increase strength. At this point, the liner 24 is folded flat for installation. Before the liner 24 enters the host pipe 22, it is coated on the exterior surface 26 with 1-part moisture-curing urethane grout. This grout material 30 cures and expands during installation, adhering to both the TPU liner 24 and the host pipe 22.

As will be discussed further below, in the example embodiments, a 2-part urethane grout is sprayed onto the inner diameter surface of the host pipe 22 during installation. In other words, urethane grout is sprayed onto the inner diameter surface of the host pipe 22 during installation, and as the TPU liner 24 is being pulled through the host pipe 22 by a cable 40 and a rolling dolly 42, a set of mixing/spraying heads 44 mounted to the rolling dolly 42 sprays the coating of 2-part urethane grout (optionally including entrained fibers) onto the inner diameter surface of the host pipe 22 (just ahead of the liner 24 as it is pulled through the host pipe 22). The 2-part urethane grout includes 1-part of the urethane and 1-part of a curing agent. The 1-part expanding urethane grout applied to the exterior surface 26 of the liner 24 before it enters the host pipe 22 combined with the 2-part expanding urethane grout sprayed onto the inner diameter surface of the host pipe 22 as the liner 24 is pulled through the host pipe 22, serve to provide a high strength, and highly adhesive interface between the liner 24 and the host pipe 22, while also migrating and expanding to fill any cracks, voids or imperfections in the host pipe 22 or adjoining service lines.

Figure 3:
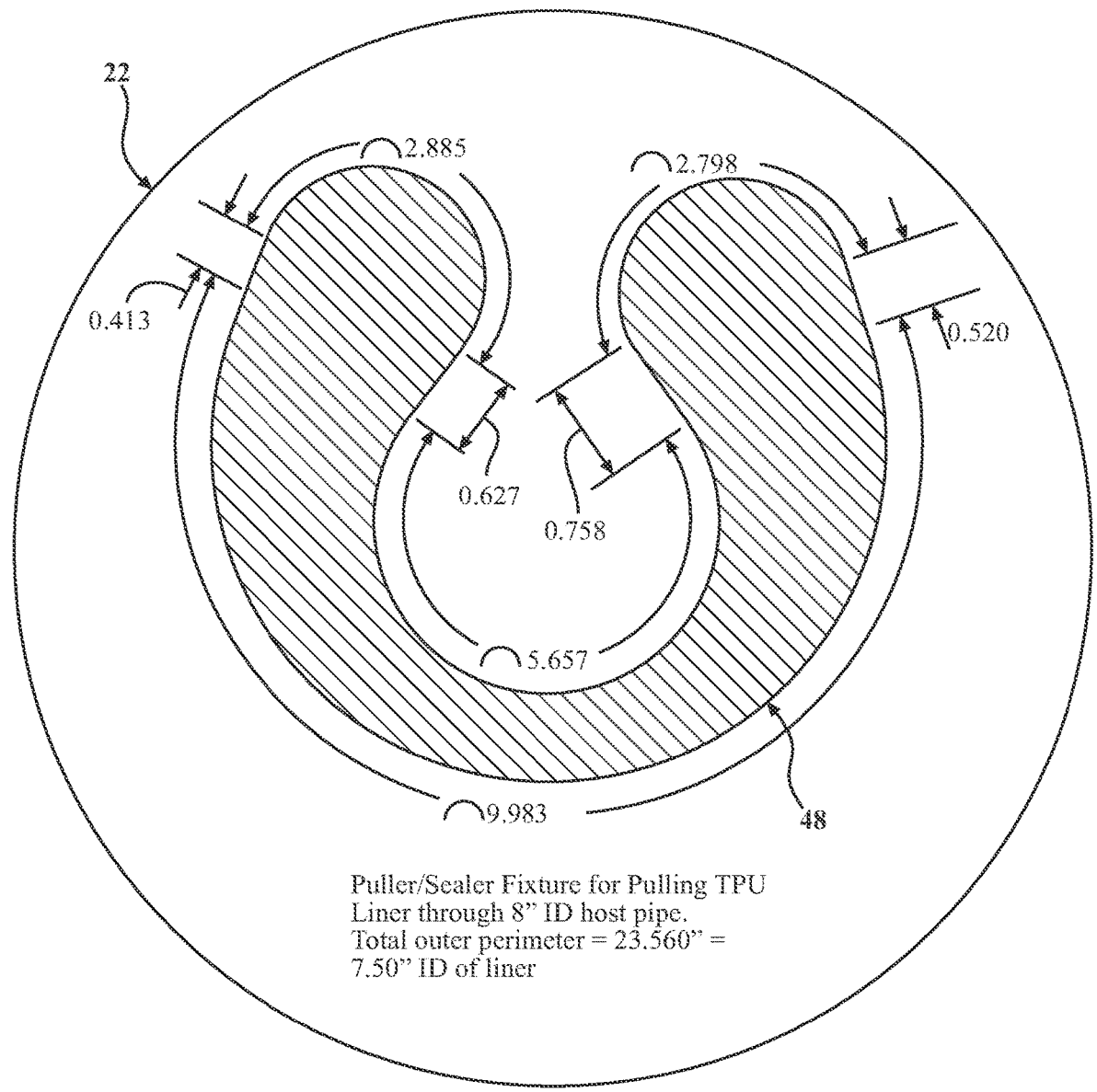
FIG. 3 is a cross-sectional view of a puller/sealer fixture disposed inside of the host pipe which configures the liner for passage through the host pipe with minimal interference with the inner diameter of the host pipe and which seals an inner diameter of the liner from water, debris, and grout material.
Figure 4:
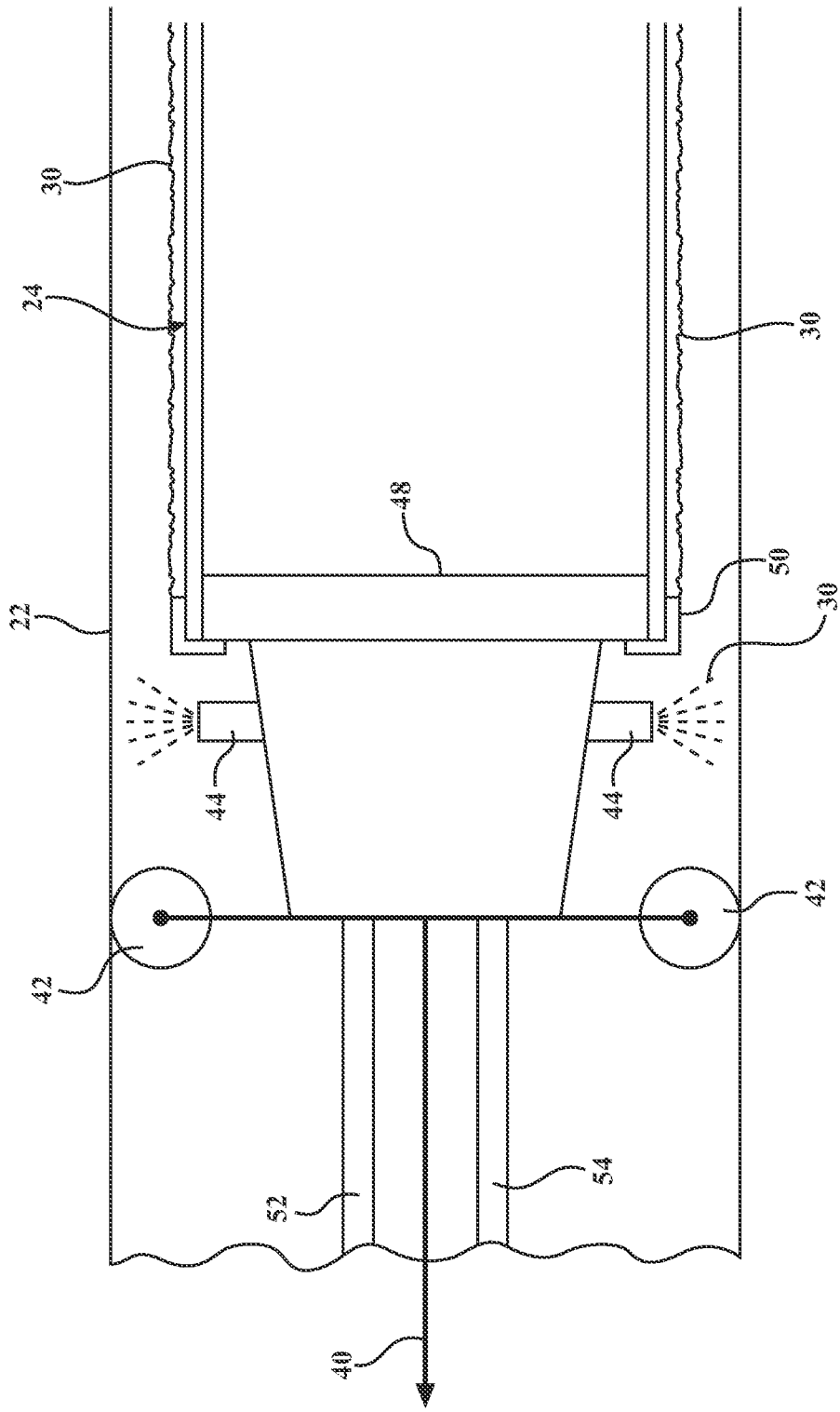
FIG. 4 illustrates the puller/sealer fixture attached to a spraying fixture and rolling dolly used to install the liner in the host pipe.
Figure 5:
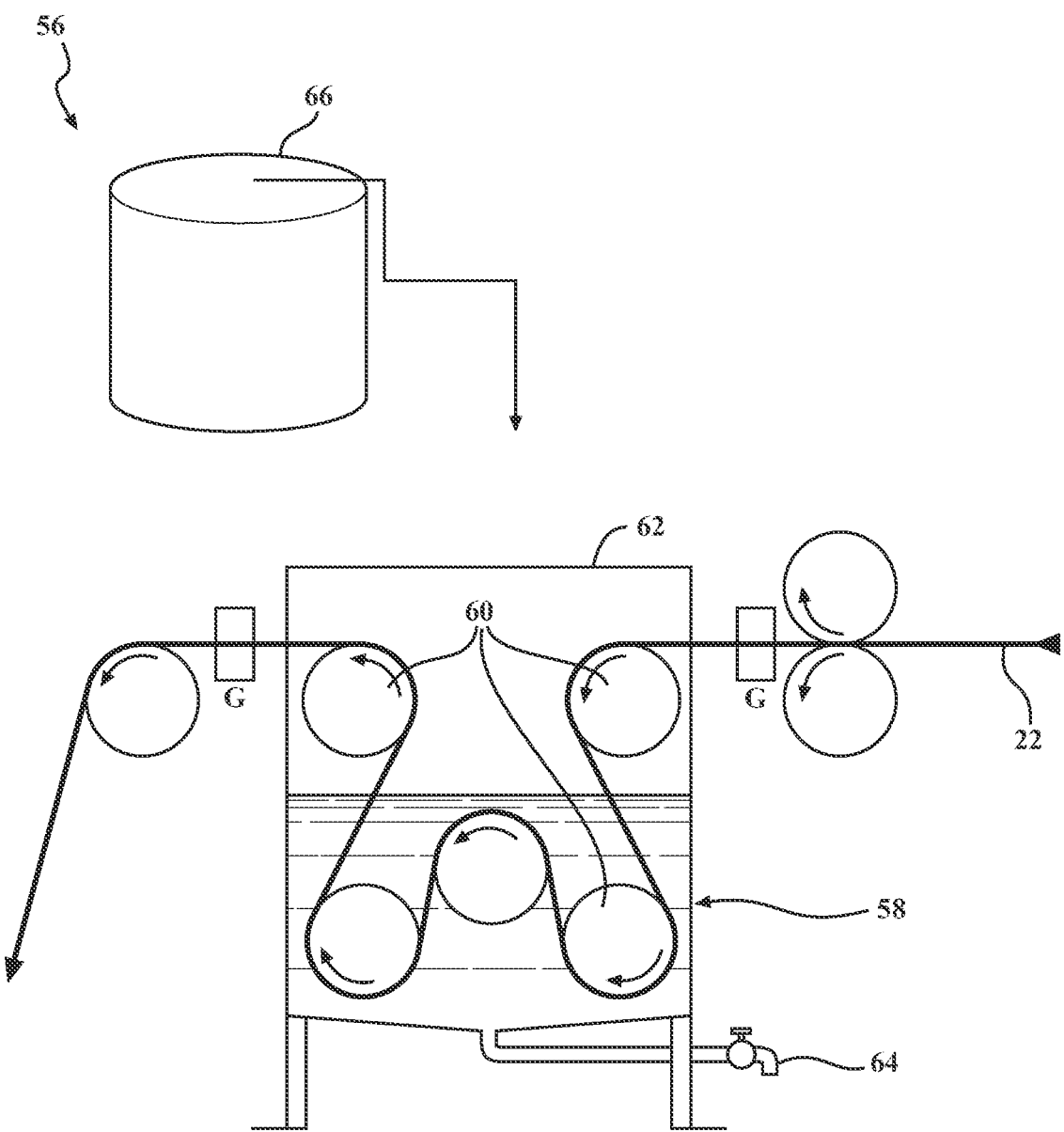
FIG. 5 illustrates an example of a dip tank assembly for coating the liner with a 1-part moisture-curing urethane grout according to an example embodiment.

The method of installing the liner 24 in the host pipe 22 according to example embodiments will now be described in more detail with reference to FIGS. 3 and 4. When the TPU liner 24 is ready for installation, it is coiled, laying flat like a fire hose, onto reels. At the jobsite where the host pipe 22 is located, the liner 24 is routed through a dip (or soaking) tank assembly 56 containing the 1-part moisture-curing urethane grout. FIG. 5 illustrates the liner 24 being routed through the dip tank assembly 56 according an example embodiment. The dip tank assembly 56 is capable of uniformly coating the liner 24 with the 1-part moisture-curing urethane grout, for example an unactivated liquid polyurethane. The dip tank assembly 56 is also able to apply the 1-part moisture-curing urethane grout to liners 24 varying from 2 inches to 20 feet in diameter, for example 6 inches to 12 inches in diameter. The dip tank assembly 56 is robust in construction, easy to maintain and service, and is portable in nature. As shown in FIG. 5, the dip tank assembly 56 includes a coating tank 58 which guides the liner 24 through the liquid polyurethane using a series of vertical and horizontal rollers 60. Guide rollers G are used to guide the liner 24 from a supply into the coating tank 58, and guide rollers G are again used to guide the coated liner 24 from the coating tank 58 to a manhole where the liner 24 will be used to repair the damaged pipe 22. The coating tank 58 is typically formed of aluminum and includes a removable top 62 and a drain 64. However, the design and the material used to form the coating tank 58 can vary. The rollers 60 are typically formed of ultra-high density polyurethane. However, the dip tank assembly 56 could include a different array of rollers 60, and/or the rollers 60 could be formed of different materials. The dip tank assembly 56 also includes a mixing tank 66 acting as a reservoir to supply additional liquid polyurethane to the coating tank 58 on demand to maintain the liquid level in the coating tank 58. The mixing tank 66 can also be formed of aluminum, or another material. Example specifications of the coating tank 58 and the mixing tank 66 are provided in FIG. 6. These specifications are general in nature and can be adjusted as required prior to fabrication of the dip tank assembly 56.

The TPU liner 24, with its exterior surface 26 soaked in the urethane grout, is directed down into an opening of the host pipe 22. The TPU liner 24 is there attached to a spraying fixture 46 via the puller/sealer fixture 48, as shown in FIGS. 3 and 4. The puller/sealer fixture 48 is a solid piece of material which serves as a mounting fixture which configures the liner 24 for optimal passage through the host pipe 22, with minimal interference with the inner diameter surface of the host pipe 22. In the example embodiment, the puller/sealer fixture 48 has a U-shaped cross-section with no sharp edges. The puller/sealer fixture 48 maintains the liner 24 in an appropriate position, without any sharp edges along the liner 24. In the example embodiment, the puller/sealer fixture 48 has an outer perimeter of 23.560 inches, which is equal to the length of the 7.5 inch inner diameter of the liner 24. Jigs or clamps 50 can be used to secure the liner 24 to the puller/sealer fixture 48. The puller/sealer fixture 48 also prevents debris, moisture, and/or the grout material 30 from entering the interior of the liner 24. For example, the clamps 50 can secure the liner 24 tightly against the puller/sealer fixture 48 to prevent the debris, moisture, and/or the grout material 30 from entering the interior of the liner 24. During installation, the puller/sealer fixture 48 is attached to the rolling dolly 42 and pulled by the cable 40 through the host pipe 22.

A set of the mixing/spraying heads 44 is also attached to the dolly 42 and are pulled through the host pipe 22 during installation. The mixing/spraying heads 44 receive two urethane grout feed lines 52, 54 routed from the pulling side, such as along the cable, that will mix the 2-part grout before spraying the mixture onto the inner diameter surface of the host pipe 22. One feed line 52 includes the urethane and a second feed line 54 includes a curing agent. The rate of flow into the mixing/spraying heads 44 will be controlled automatically as a function of the velocity of the dolly 42 and the entire assembly through the host pipe 22 so as to assure a consistent coating of the host pipe 22 throughout. Thus, the area between the liner 24 and the host pipe 22 is filled with both the 1-part and 2-part urethane grout. Once the full length of the TPU liner 24 has been pulled through the host pipe 22, the ends of the liner 24 are capped, and the liner 24 is inflated to a specific pressure. The grout material 30 is exposed to moisture, ultra violet radiation, heat, and/or ultrasonics and thus cures and expands to adhere to the liner 24 and the inner diameter surface of the damaged pipe 22. The grout material 30 is typically in the form of a foam and bonds to the extruded liner 24, forming an adhesive and preferably cohesive bond, such that the plurality of flared tips 34 are not required for the liner 24 and grout material to maintain contact. After an appropriate curing period, pressure is released from the interior of the liner 24. Ends of the liner 24, as well as access points for laterals (service lines), can then be trimmed.

Obviously, many modifications and variations of the present invention are possible in light of the above teachings and may be practiced otherwise than as specifically described while within the scope of the following claims.

The invention claimed is:

1. A method of manufacturing an expandable pipe for restoring a damaged pipe, comprising the steps of:
   extruding a liner formed of a polymer-based and/or elastomer-based material and including a plurality of fibers, the extruded liner including an exterior surface with a plurality of grooves, and
   disposing a grout material formed of polyurethane and fibers in the grooves of the liner, and the grout material being expandable in a dimension upon exposure to moisture, ultra violet radiation, heat, and/or ultrasonics, wherein the step of disposing the grout material in the grooves of the liner includes soaking the liner.

2. The method of claim 1, wherein the grout material is expandable in a dimension upon exposure to ultra violet radiation.

3. The method of claim 1, wherein the grout material is expandable in a dimension upon exposure to heat.

4. The method of claim 1, wherein the grout material is expandable in a dimension upon exposure to ultrasonics.

5. The method of claim 1, wherein the liner is formed of thermoplastic polyurethane (TPU) or polyethylene.

6. The method of claim 1, wherein the liner is clear.

7. The method of claim 1, wherein the liner includes reinforcing fibers.

8. The method of claim 1, wherein the grooves of the liner are formed between flared tips.

9. The method of claim 1, including forming a weld in the liner.

10. The method of claim 1 including welding the extruded liner so that the extruded liner has a diameter with a circular shape.

11. The method of claim 1, wherein the grout material cures and expands after disposing the grout material on the liner.

* * * * *